US008825351B2

(12) United States Patent
Yuse et al.

(10) Patent No.: US 8,825,351 B2
(45) Date of Patent: Sep. 2, 2014

(54) TERMINAL APPARATUS FOR TRANSMITTING OR RECEIVING A SIGNAL INCLUDING PREDETERMINED INFORMATION

(71) Applicant: Sanyo Electric Co., Ltd., Osaka (JP)

(72) Inventors: Yoshio Yuse, Sumoto (JP); Fuminori Takama, Tottori (JP); Masafumi Furuke, Tottori (JP); Makoto Nagai, Kakamigahara (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 18 days.

(21) Appl. No.: 13/710,033

(22) Filed: Dec. 10, 2012

(65) Prior Publication Data

US 2013/0103292 A1    Apr. 25, 2013

Related U.S. Application Data

(63) Continuation of application No. PCT/JP2011/003345, filed on Jun. 13, 2011.

(30) Foreign Application Priority Data

Jun. 14, 2010   (JP) ................................. 2010-135597

(51) Int. Cl.
*G06F 19/00* (2011.01)
*H04W 4/00* (2009.01)
*H04B 7/14* (2006.01)

(52) U.S. Cl.
USPC ............... 701/117; 370/328; 370/331; 455/8; 455/9

(58) Field of Classification Search
None
See application file for complete search history.

(56) References Cited

U.S. PATENT DOCUMENTS

| 5,539,645 | A  | * | 7/1996 | Mandhyan et al. | 701/119 |
| 7,099,770 | B2 | * | 8/2006 | Naden et al. | 701/117 |
| 2002/0137521 | A1 | * | 9/2002 | Kim et al. | 455/453 |
| 2003/0036397 | A1 | * | 2/2003 | Takahashi | 455/502 |
| 2003/0123479 | A1 | * | 7/2003 | Lee et al. | 370/466 |

(Continued)

FOREIGN PATENT DOCUMENTS

| JP | 2005-202913 A | 7/2005 |
| JP | 2008-219409 A | 9/2008 |

(Continued)

OTHER PUBLICATIONS

International Search Report issued in International Application No. PCT/JP2011/003345 mailed Jul. 12, 2011.

(Continued)

*Primary Examiner* — Calvin Cheung
*Assistant Examiner* — Krishnan Ramesh
(74) *Attorney, Agent, or Firm* — McDermott Will & Emery LLP (57) ABSTRACT

A modem unit receives a signal broadcasted by a base station apparatus. A storage unit extracts information included in the received signal and stores the extracted information. A detection unit detects a fact that the signal broadcasted by the base station apparatus is not received. A generation unit measures a period of time starting when the storage unit has stored the information. When the detection unit detects the fact and when the measured period of time is shorter than a threshold, the generation unit broadcasts a signal including the information stored in the storage unit.

7 Claims, 9 Drawing Sheets

(56) References Cited

U.S. PATENT DOCUMENTS

| | | | |
|---|---|---|---|
| 2004/0082350 A1* | 4/2004 | Chen et al. | 455/518 |
| 2007/0070892 A1* | 3/2007 | Lee et al. | 370/229 |
| 2007/0208496 A1* | 9/2007 | Downs et al. | 701/117 |
| 2008/0004791 A1* | 1/2008 | Sera | 701/117 |
| 2008/0014908 A1* | 1/2008 | Vasant | 455/414.1 |
| 2008/0059051 A1* | 3/2008 | Kumagai et al. | 701/117 |
| 2008/0090522 A1* | 4/2008 | Oyama | 455/41.2 |
| 2008/0134276 A1* | 6/2008 | Orrell et al. | 725/132 |
| 2008/0281508 A1* | 11/2008 | Fu | 701/201 |
| 2008/0306678 A1* | 12/2008 | Miyawaki | 701/118 |
| 2009/0034453 A1* | 2/2009 | Motegi et al. | 370/328 |
| 2009/0109953 A1* | 4/2009 | Tsang et al. | 370/350 |
| 2009/0141674 A1* | 6/2009 | Masuda et al. | 370/329 |
| 2009/0189780 A1* | 7/2009 | Machida | 340/901 |
| 2009/0228193 A1* | 9/2009 | Guerrero et al. | 701/118 |
| 2009/0292373 A1* | 11/2009 | Miyata et al. | 700/1 |
| 2010/0051692 A1* | 3/2010 | Knudson et al. | 235/439 |
| 2010/0067438 A1* | 3/2010 | Nakaoka et al. | 370/328 |
| 2010/0128762 A1* | 5/2010 | Nabetani et al. | 375/219 |
| 2010/0165846 A1* | 7/2010 | Yamaguchi et al. | 370/236 |
| 2010/0214981 A1* | 8/2010 | Saito | 370/328 |
| 2011/0066315 A1* | 3/2011 | Sumizawa | 701/29 |
| 2011/0066361 A1* | 3/2011 | Sumizawa | 701/118 |
| 2011/0134789 A1* | 6/2011 | Nagai et al. | 370/252 |
| 2011/0167176 A1* | 7/2011 | Yew et al. | 710/6 |
| 2011/0211455 A1* | 9/2011 | Nakaoka et al. | 370/241 |
| 2011/0228866 A1* | 9/2011 | Nagai et al. | 375/259 |
| 2011/0299487 A1* | 12/2011 | Ito et al. | 370/329 |
| 2012/0028662 A1* | 2/2012 | Nagai et al. | 455/500 |
| 2012/0096467 A1* | 4/2012 | Inoue et al. | 718/102 |
| 2012/0140695 A1* | 6/2012 | Hunzinger et al. | 370/315 |
| 2012/0195253 A1* | 8/2012 | Irvine | 370/328 |
| 2012/0230327 A1* | 9/2012 | Nagai et al. | 370/389 |
| 2012/0236745 A1* | 9/2012 | Nagai et al. | 370/252 |
| 2012/0236746 A1* | 9/2012 | Nagai et al. | 370/252 |
| 2012/0236841 A1* | 9/2012 | Nakaoka et al. | 370/345 |
| 2012/0238222 A1* | 9/2012 | Nakaoka et al. | 455/90.1 |
| 2012/0238296 A1* | 9/2012 | Nagai et al. | 455/456.4 |
| 2012/0268295 A1* | 10/2012 | Yuse et al. | 340/905 |
| 2012/0269121 A1* | 10/2012 | Nagai et al. | 370/328 |
| 2012/0314615 A1* | 12/2012 | Nagai et al. | 370/252 |
| 2012/0320853 A1* | 12/2012 | Kwon et al. | 370/329 |
| 2013/0058283 A1* | 3/2013 | Cho et al. | 370/328 |

FOREIGN PATENT DOCUMENTS

| | | |
|---|---|---|
| JP | 2008-294646 A | 12/2008 |
| JP | 2009-065361 A | 3/2009 |
| JP | 2009-217593 A | 9/2009 |

OTHER PUBLICATIONS

International Preliminary Repot on Patentability with English translation issued in International Application No. PCT/JP2011/003345 mailed Jul. 12, 2011.

* cited by examiner

TERMINAL APPARATUS FOR TRANSMITTING OR RECEIVING A SIGNAL INCLUDING PREDETERMINED INFORMATION

RELATED APPLICATIONS

This application is a Continuation of International Application No. PCT/JP2011/003345, filed on Jun. 13, 2011, which in turn claims the benefit of Japanese Application No. 2010-135597, filed on Jun. 14, 2010, the disclosures of which Applications are incorporated by reference herein.

BACKGROUND OF THE INVENTION

1. Field of the Invention

The present invention relates to a communication technique, and in particular, to a terminal apparatus for transmitting or receiving a signal including predetermined information.

2. Description of the Related Art

Consideration of road-to-vehicle communications is underway to prevent encounter head traffic accidents at intersections. In the road-to-vehicle communication, information on the situations of an intersection are communicated between a road-side apparatus and on-vehicle equipment. In the road-to-vehicle communication, it becomes necessary to install the road-side apparatuses, which requires large efforts and high cost. On the other hand, in inter-vehicle communication, i.e., in a mode in which information is communicated between on-vehicle equipment, it becomes unnecessary to install the road-side apparatuses. In this case, it is determined, by detecting at real-time current location information with, for example, a GPS (Global Positioning System), etc., and by exchanging the location information between the on-vehicle equipment, which road each of a driver's vehicle and other vehicles exists on, the road entering an intersection.

In a wireless LAN (Local Area Network) in accordance with the specification of IEEE 802.11, etc., an access control function called CSMA/CA (Carrier Sense Multiple Access with Collision Avoidance) is used. Accordingly, in the wireless LAN, the same wireless channel is shared by a plurality of terminal apparatuses. In such CSMA/CA, a packet signal is transmitted after it has been confirmed that another packet signal is not transmitted by carrier sense.

When a wireless LAN is applied to inter-vehicle communication, such as ITS (Intelligent Transport Systems), it is desirable that a signal is transmitted by broadcast transmission because it is needed to transmit the information to an unspecified majority of terminal apparatuses. Further, if road-to-vehicle communication is performed in addition to inter-vehicle communication, the communication becomes more complicated.

The information, which are necessary for safe driving, such as construction information and regulation information, and which do not affect the existing location of each vehicle, are generally stored in a server, etc. Road-to-vehicle communication is suitable for the delivery of the information stored in a server, etc. However, in a transitional situation or in a district in which the number of the installed road-side apparatuses is small, the area of road-to-vehicle communication becomes narrow. Accordingly, the information necessary for safe driving, such as construction information and regulation information, cannot be sufficiently delivered. On the other hand, delivery of these information should be limited to an area or period of time that may be affected by these information, from the viewpoint of effectively using frequencies.

SUMMARY OF THE INVENTION

The present invention has been made in view of these situations, and a purpose of the invention is to provide a technique in which information to be delivered in inter-terminal communication can be efficiently broadcasted.

Means for Solving the Problem

In order to solve the aforementioned problem, a terminal apparatus according to an embodiment of the present invention is used for performing terminal-to-terminal communication, and the terminal apparatus comprises: a reception unit configured to receive a signal broadcasted by a base station apparatus; a storage unit configured to extract information included in the signal received in the reception unit and to store the extracted information; a detection unit configured to detect a fact that the reception unit does not receive the signal broadcasted by the base station apparatus; and a broadcasting unit configured to broadcast a signal including the information stored in the storage unit when the detection unit detects the fact.

Note that any combination of the aforementioned components or any manifestation of the present invention realized by modifications of a method, apparatus, system, storing media, computer program, and so forth, is effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

REFERENCE NUMERALS

DETAILED DESCRIPTION OF THE INVENTION

The invention will now be described by reference to the preferred embodiments. This does not intend to limit the scope of the present invention, but to exemplify the invention.

Prior to specifically describing the present invention, an outline of the invention will be stated. An embodiment of the invention relates to a communication system in which inter-vehicle communication is performed between terminal apparatuses mounted on vehicles and road-to-vehicle communication is also performed from a base station apparatus installed at an intersection, etc., to the terminal apparatuses. As the inter-vehicle communication, the terminal apparatus performs broadcast transmission of a packet signal storing information on vehicle speed or location, etc., (hereinafter, these information are referred to as "data"). Other terminal apparatuses receive the packet signal and recognize approach of the vehicle, etc., based on the data. Herein, the base station apparatus repeatedly specifies frames in which a plurality of subframes are included. For the road-to-vehicle communication, the base station apparatus selects any one of the plurality of subframes to perform, during a period of the leading portion of the selected subframe, broadcast transmission of a packet signal in which control information, etc., are stored.

The control information includes information on a period during which the base station apparatus performs broadcast transmission of a packet signal (hereinafter, referred to as a "road-to-vehicle transmission period"). The terminal apparatus specifies the road-to-vehicle transmission period based on the control information and transmits a packet signal during a period other than the road-to-vehicle transmission period. Thus, the road-to-vehicle communication and inter-vehicle communication are time division multiplexed, and hence the probability that the packet signals from the two apparatuses may collide with each other can be reduced. That is, interference between the road-to-vehicle communication and inter-vehicle communication can be reduced by the terminal apparatus recognizing the content of the control information. Herein, the terminal apparatus transmits the packet signal in a CSMA method during a period for performing the inter-vehicle communication (hereinafter, referred to as a "inter-vehicle transmission period") other than the road-to-vehicle transmission period.

Each base station apparatus is connected to a server via a network and the server stores information necessary for safe driving, such as construction information and regulation information. The base station apparatus stores, for example, the construction information in a packet signal to perform broadcast transmission of the packet signal during the aforementioned road-to-vehicle transmission period. Because the terminal apparatus that has received the packet signal from the base station apparatus acquires the construction information and regulation information, etc., a driver performs safe driving based on these information. However, there can be a situation in which the number of the installed base station apparatuses is small immediately after the communication system has introduced. A district can also exist where the number of the installed base station apparatuses is small because the necessity of the base station apparatuses is low. Under these situations, it becomes difficult to receive a packet signal broadcasted by the base station apparatus. To deal with this, the terminal apparatus stores the construction information and regulation information, etc., after receiving the packet signal from the base station apparatus. On the other hand, when it becomes impossible to receive the packet signal from the base station apparatus, i.e., when existing outside the area formed by the base station apparatus, the terminal apparatus performs broadcast transmission of the packet signal including the stored construction information and regulation information, etc. In the following description, the base station apparatus corresponds to, for example, a road-side apparatus and the terminal apparatus to on-vehicle equipment.

Herein, the traffic jam information, construction information, and regulation information can be said to be "information on traffic disturbance". Further, the traffic jam information and construction information can be said to be information for making a driver determine whether a traffic disturbance is to be avoided. That is, it is left to the determination of a driver who has acquired these information whether to advance irrespective of the traffic jam information and construction information. On the other hand, the regulation information can be said to be information for prompting a driver to avoid a traffic disturbance. That is, a driver who has acquired the regulation information does not have an option other than avoiding a traffic disturbance. Further, "information on smooth travel of vehicle" may be used instead of or along with such the "information on traffic disturbance". The "information on smooth travel of vehicle" means, for example, the information on a road having an amount of traffic smaller than a threshold, i.e., an empty road.

Figure 1:
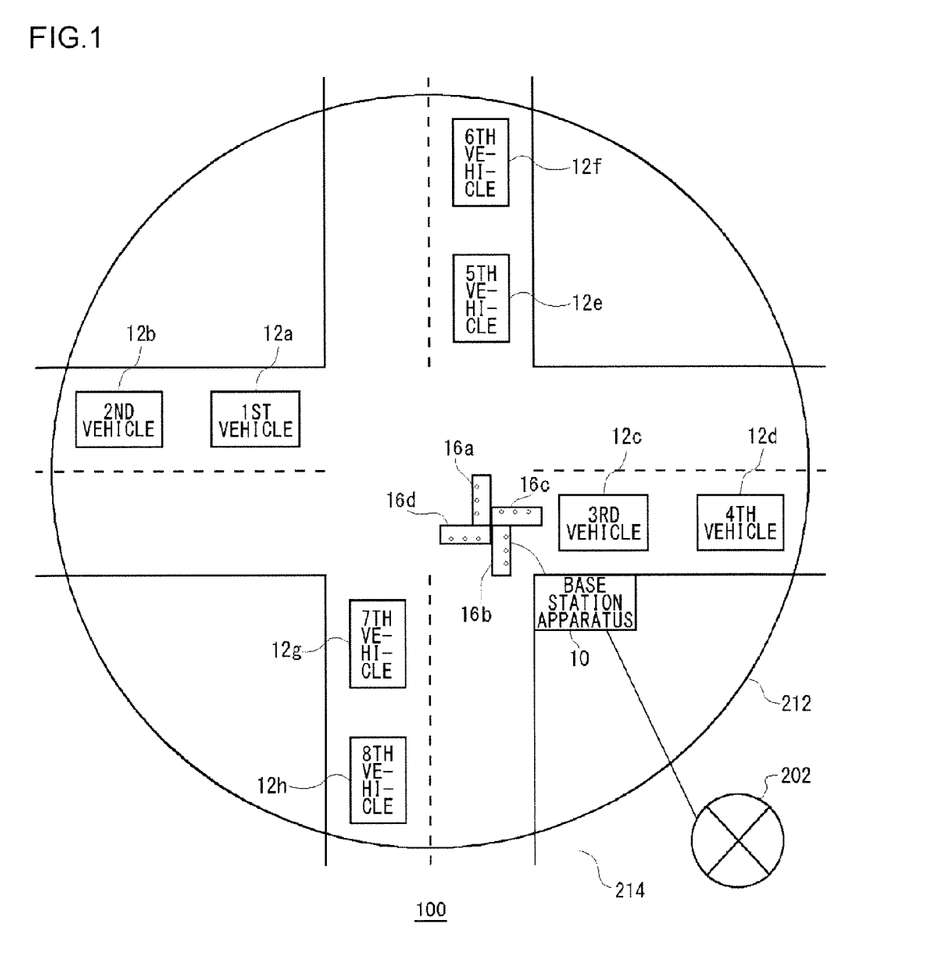
FIG. 1 is a view illustrating the structure of a communication system according to an embodiment of the present invention.

FIG. 1 illustrates the structure of a communication system 100 according to an embodiment of the present invention. This view can be obtained by seeing an intersection from above. The communication system 100 comprises: a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as a vehicle 12; a first traffic light 16a, a second traffic light 16b, a third traffic light 16c, and a fourth traffic light 16d, which are collectively referred to as a traffic light 16; and a network 202. A non-illustrated terminal apparatus is mounted on each vehicle 12. An area 212 is formed around the base station apparatus 10 and an outside area 214 is formed outside the area 212.

As illustrated, a road running in the horizontal direction, i.e., in the left-right direction in the view and that running in the vertical direction, i.e., in the up-down direction in the view, intersect with each other at the center portion. Herein, the upper side in the view corresponds to the "North" direction, the left side to the "West" direction, the lower side to the "South" direction, and the right side to the "East" direction. The portion where the two roads intersect with each other is an "intersection". The first vehicle 12a and second vehicle 12b are traveling from left to right, and the third vehicle 12c and fourth vehicle 12d are traveling from right to left. The fifth vehicle 12e and sixth vehicle 12f are traveling from up to down, and the seventh vehicle 12g and eighth vehicle 12h are traveling from down to up. The first traffic light 16a is installed for the vehicles 12 that are traveling from left to right, the second traffic light 16b is installed for the vehicles 12 that are traveling from right to left, the third traffic light 16c is installed for the vehicles 12 that are traveling from up to down, and the fourth traffic light 16d is installed for the vehicles that are traveling from down to up. The base station apparatus 10 is arranged to be associated with the traffic light 16.

In the communication system 100, the base station apparatus 10 is arranged at an intersection. The base station apparatus 10 controls the communication between terminal apparatuses. The base station apparatus 10 repeatedly generates, based on either a signal received from a non-illustrated GPS satellite or a frame formed by another non-illustrated base station apparatus 10, frames each including a plurality of subframes. Herein, it is specified that a road-to-vehicle transmission period can be set in the leading portion of each subframe. Of the plurality of subframes, the base station apparatus 10 selects a subframe in which a road-to-vehicle transmission period is not set by another base station apparatus 10. The base station apparatus 10 sets a road-to-vehicle transmission period in the leading portion of the selected subframe. The base station apparatus 10 broadcasts a packet signal during the set road-to-vehicle transmission period. A plurality of types of data are assumed as the data to be included in the packet signal. These are data on traffic jam information and construction information, etc. The base station apparatus 10 broadcasts, as a packet signal including these data, an RSU packet signal during the road-to-vehicle transmission period.

The packet signal from the base station apparatus 10 also includes information on the set road-to-vehicle transmission period, and the information corresponding to the control information. The terminal apparatus is mounted on the vehicle 12 driven by an engine to perform inter-terminal transmission. The terminal apparatus generates a frame based on the control information included in the received packet signal. As a result, the frame generated in each of a plurality of the terminal apparatuses synchronizes with the frame generated in the base station apparatus 10. The terminal apparatus also broadcasts, during the inter-vehicle transmission period, a packet signal in carrier sense. Herein, the terminal apparatus acquires data to store in the packet signal. The data includes, for example, information on an existing location.

The terminal apparatus also stores the control information in the packet signal. That is, the control information transmitted from the base station apparatus 10 is transferred by the terminal apparatus. On the other hand, a terminal apparatus that cannot receive the packet signal from the base station apparatus 10, i.e., a terminal apparatus that exists in the outside area 214 broadcasts the packet signal by performing CSMA/CA, irrespective of the structure of a frame. Further, the terminal apparatus notifies a driver of approach of a vehicle on which another terminal apparatus is mounted by receiving a packet signal from the another terminal apparatus. Also, when existing in the area 212, the terminal apparatus receives the packet signal from the base station apparatus to extract traffic jam information and regulation information, etc., included in the packet signal. The terminal apparatus stores the traffic jam information and regulation information, etc. On the other hand, when transferring from the area 212 to the outside area 214, i.e., when not receiving the packet signal from the base station apparatus 10, the terminal apparatus stores the stored traffic jam information and regulation information, etc., into the packet signal. The terminal apparatus performs broadcast transmission of the packet signal during the inter-vehicle transmission period.

Figure 2:
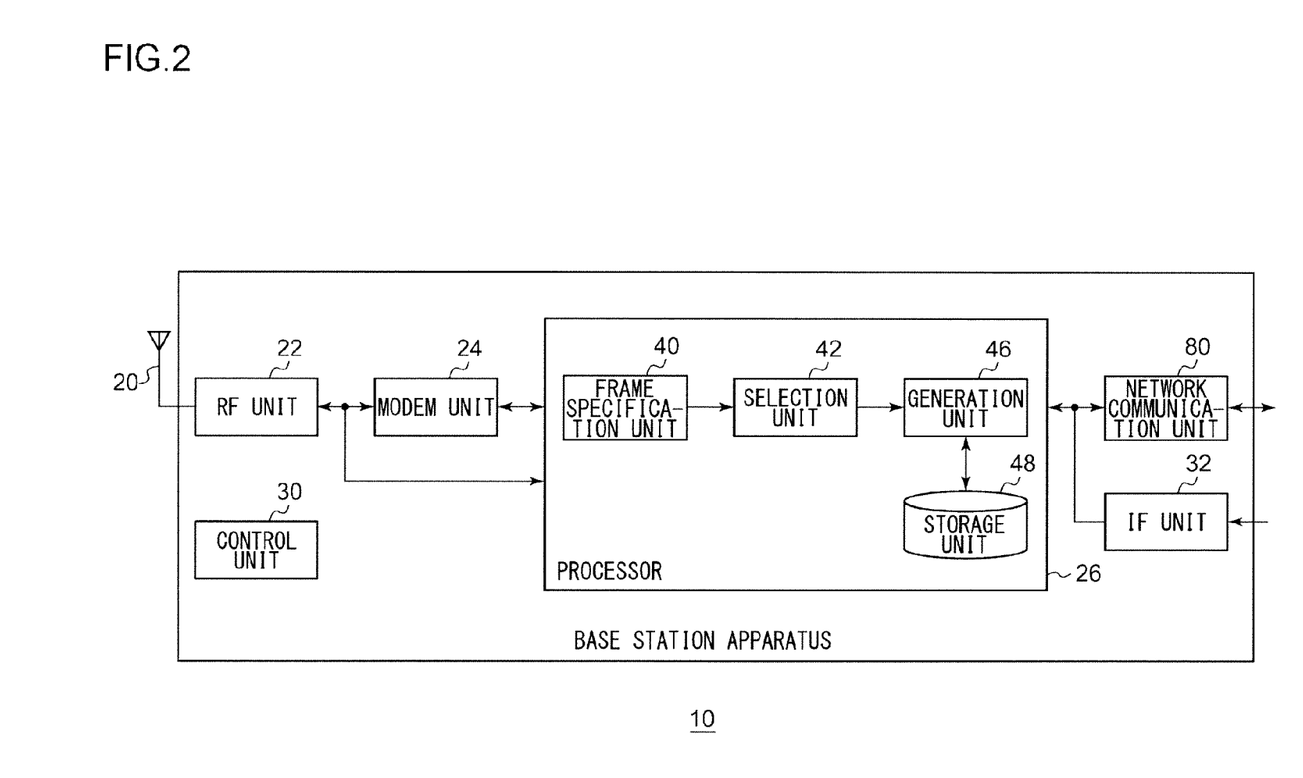
FIG. 2 is a view illustrating the structure of a base station apparatus in FIG. 1.

FIG. 2 illustrates the structure of the base station apparatus 10. The base station apparatus 10 includes an antenna 20, an RF unit 22, a modem unit 24, a processor 26, a control unit 30, an IF unit 32, and a network communication unit 80. The processor 26 includes a frame specification unit 40, a selection unit 42, a generation unit 46, and a storage unit 48. The RF unit 22 receives, as a reception process, the packet signal from the non-illustrated terminal apparatus or another base station apparatus 10 with the antenna 20. The RF unit 22 performs frequency conversion on the received packet signal having a radio frequency to generate a baseband packet signal. Further, the RF unit 22 outputs the baseband packet signal to the modem unit 24. Because a baseband packet signal is generally formed of an in-phase component and a quadrature component, two signal lines should be illustrated; however, a single signal line is to be illustrated herein for clarity of the view. The RF unit 22 also includes an LNA (Low Noise Amplifier), a mixer, an AGC, and an A/D conversion unit.

The RF unit 22 performs, as a transmission process, frequency conversion on the baseband packet signal inputted from the modem unit 24 to generate a packet signal having a radio frequency. Further, the RF unit 22 transmits, during the road-to vehicle transmission period, the packet signal having a radio frequency from the antenna 20. The RF unit 22 also includes a PA (Power Amplifier), a mixer, and a D/A conversion unit.

The modem unit 24 performs, as a reception process, demodulation on the baseband packet signal from the RF unit 22. Further, the modem unit 24 outputs a result of the demodulation to the processor 26. The modem unit 24 also performs, as a transmission process, modulation on the date from the processor 26. Further, the modem unit 24 outputs, as a baseband packet signal, a result of the modulation to the RF unit 22. Herein, because the communication system 100 deals with the OFDM (Orthogonal Frequency Division Multiplexing) modulation method, the modem unit 24 also performs FFT (Fast Fourier Transform) as a reception process, and also performs IFFT (Inverse Fast Fourier Transform) as a transmission process.

Figure 3A:
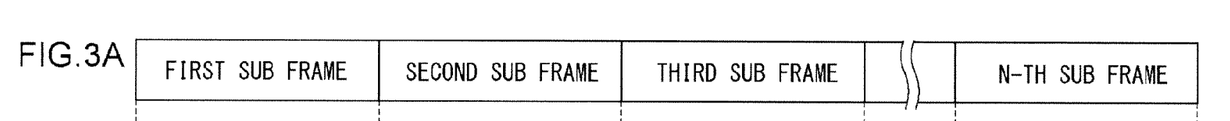
FIGS. 3(a) to 3(d) are views illustrating the format of a frame specified in the communication system in FIG. 1.
Figure 3B:
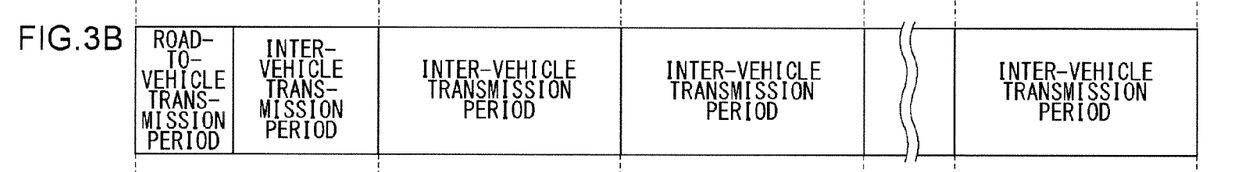
Figure 3C:
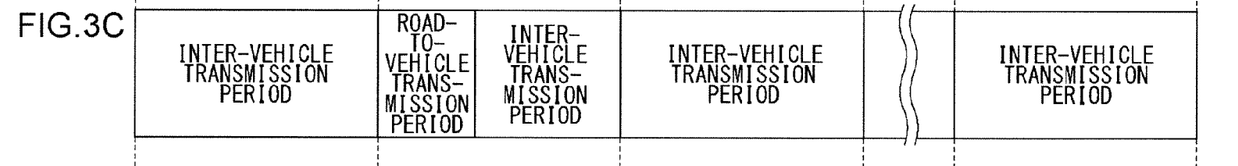
Figure 3D:
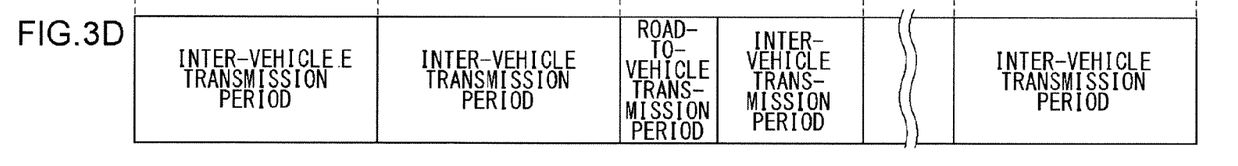

The frame specification unit 40 receives a signal from a non-illustrated GPS satellite to acquire information on time based on the received signal. A publicly-known technique is to be used for the acquisition of the information on time, and hence description will be omitted herein. The frame specification unit 40 generates a plurality of frames based on the information on time. For example, the frame specification unit 40 generates ten frames each having a period of "100 msec" by dividing a period of "1 sec" into ten pieces based on the timing indicated by the information on time. It is specified that frames are repeated by repeating such a process. Alternatively, the frame specification unit 40 may detect the control information from the result of the demodulation to generate a frame based on the detected control information. Such a process corresponds to generation of a frame synchronized with the timing of a frame formed by another base station apparatus 10. FIGS. 3(a) to 3(d) illustrate the format of a frame specified in the communication system 100. FIG. 3(a) illustrates the structure of the frame. The frame is formed of N pieces of subframes indicated by a first subframe through an N-th subframe. For example, when the period of the frame is 100 msec and N is 8, a subframe having a period of 12.5 msec is specified. FIGS. 3(b) to 3(d) will be described later, and description will be made referring back to FIG. 2.

Of the plurality of subframes included in a frame, the selection unit 42 selects a subframe in which a road-to-vehicle transmission period should be set. Specifically, the selection unit 42 receives the frame specified in the frame specification unit 40. The selection unit 42 inputs, via the RF unit 22 and modem unit 24, results of the demodulation from another non-illustrated base station apparatuses 10 or terminal apparatus. Of the inputted results of the demodulation, the selection unit 42 extracts that from another base station apparatus 10. A method of the extraction will be described later. The selection unit 42 specifies a subframe in which a result of the demodulation has not been received by specifying subframes in each of which a result thereof has been received. This corresponds to the specification of a subframe in which a road-to-vehicle transmission period has not been set by another base station apparatus 10, i.e., an unused subframe. When a plurality of unused subframes exist, the selection unit 42 selects a single subframe at random. When an unused subframe does not exist, i.e., when each of the plurality of unused subframes is used, the selection unit 42 acquires received powers corresponding to the results of the demodulation and preferentially selects a subframe whose received power is small.

FIG. 3(b) illustrates the structure of a frame generated by a first base station apparatus 10a. The first base station apparatus 10a sets a road-to-vehicle transmission period in the leading portion of the first subframe. The first base station apparatus 10a also sets an inter-vehicle transmission period in the first subframe following the road-to-vehicle transmission period. The inter-vehicle transmission period means a period during which a terminal apparatus can broadcast a packet signal. That is, it is specified that the first base station apparatus 10a can broadcast a packet signal during the road-to-vehicle transmission period that has been set in the leading period of the first subframe and a terminal apparatus can broadcast a packet signal during the inter-vehicle transmission period other than the road-to-vehicle transmission period in the frame. Further, the first base station apparatus 10a sets only the inter-vehicle transmission period in each of a second subframe through the N-th subframe.

FIG. 3(c) illustrates the structure of a frame generated by a second base station apparatus 10b. The second base station apparatus 10b sets a road-to-vehicle transmission period in the leading portion of the second subframe. The second base station apparatus 10b sets inter-vehicle transmission periods both in the subsequent stage of the road-to-vehicle transmission period in the second subframe and in each of the first subframe and a third subframe through the N-th frame. FIG. 3(d) illustrates the structure of a frame generated by a third base station apparatus 10c. The third base station apparatus 10c sets a road-to-vehicle transmission period in the leading portion of the third subframe. The third base station apparatus 10c also sets inter-vehicle transmission periods both in the subsequent stage of the road-to-vehicle transmission period in the third subframe and in each of the first subframe, the second subframe, and a fourth subframe through the N-th subframe. As stated above, each of the plurality of the base station apparatuses 10 selects a subframe different from those of the others to set a road-to-vehicle transmission period in the leading portion of the selected subframe. Referring back to FIG. 2, the selection unit 42 outputs the number of the selected subframe to the generation unit 46.

Figure 4A:
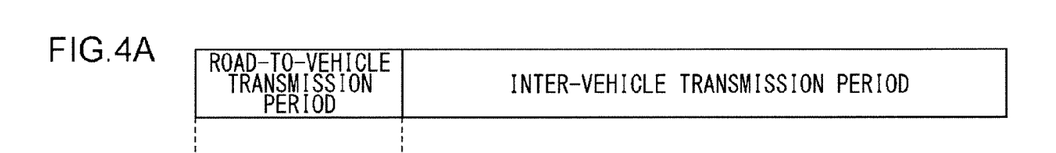
FIGS. 4(a) and 4(b) are views illustrating the structure of a subframe in FIGS. 3(a) and 3(d)
Figure 4B:
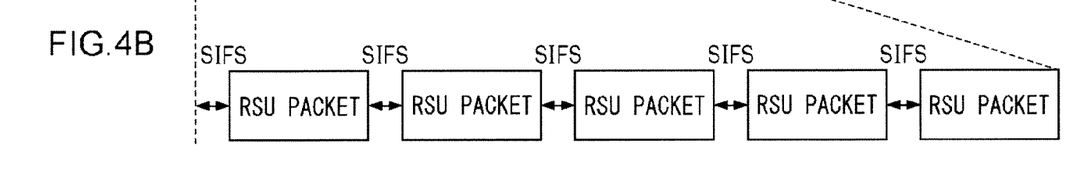

The generation unit 46 sets a road-to-vehicle transmission period in the subframe whose number has been received from the selection unit 42 to generate an RSU packet signal to be broadcasted during the road-to-vehicle transmission period. FIGS. 4(a) and 4(b) illustrate the structure of a subframe. FIG. 4(a) illustrates the subframe in which a road-to-vehicle transmission period has been set. As illustrated, a single subframe is formed in the order of a road-to-vehicle transmission period and a inter-vehicle transmission period. FIG. 4(b) illustrates arrangement of packet signals in the road-to-vehicle transmission period. As illustrated, a plurality of RSU packet signals are arranged in the road-to-vehicle transmission period. Herein, the adjacent packet signals are spaced apart from each other by an SIFS (Short Interframe Space).

Figure 5A:
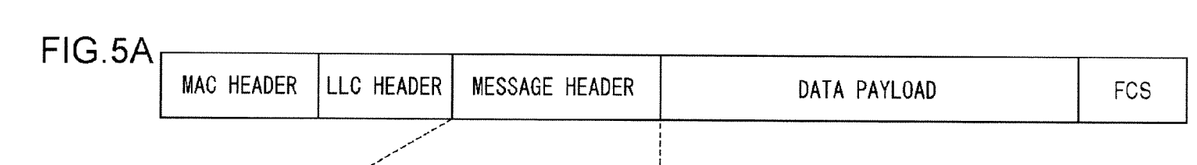
FIGS. 5(a) and 5(b) are views illustrating the format of an MAC frame stored in a packet signal specified in the communication system in FIG. 1.
Figure 5B:
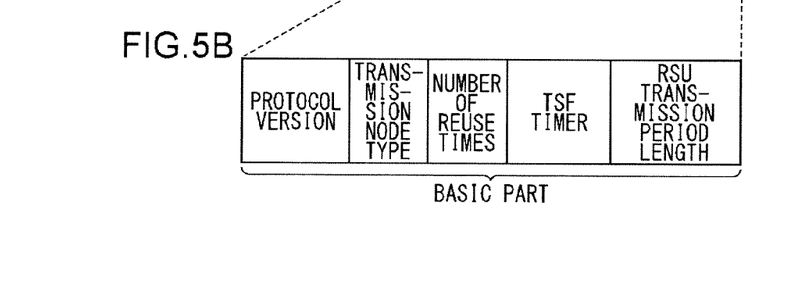

Herein, the structure of the RSU packet signal will be described. FIGS. 5(a) and 5(b) illustrate the format of an MAC frame to be stored in the packet signal specified in the communication system 100. FIG. 5(a) illustrates the format of the MAC frame. In the MAC frame, an "MAC header", an "LLC header", a "message header", a "data payload", and an "FCS" are arranged in the order from head. The information included in the data payload will be described later. FIG. 5(b) illustrates the structure of the message header generated by the generation unit 46. The message header includes a basic part in which a "protocol version", a "transmission node type", the "number of reuse times" a "TSF timer", and an "RSU transmission period length" are included. The protocol version indicates the version of a corresponding protocol. The transmission node type indicates a transmission source of a packet signal including the MAC frame. For example, "0" indicates a terminal apparatus, while "1" indicates the base station apparatus 10. Of the inputted results of the demodulation, when the selection unit 42 extracts a result of the demodulation from another base station apparatus 10, the selection unit 42 uses the value of the transmission node type. The number of reuse times indicates an indicator of the effectiveness when the message header is transferred by a terminal apparatus, while the TSF timer indicates the transmission time. The RSU transmission period length indicates a length of a road-to-vehicle transmission period, which can be said to the information on road-to-vehicle transmission period. Description will be made, referring back to FIG. 2.

The network communication unit 80 is connected to the non-illustrated network 202. The network communication unit 80 receives traffic jam information, construction information, and regulation information, etc., from the network 202. The storage unit 48 stores the received traffic jam information and construction information, etc. The IF unit 32 is connected to the non-illustrated traffic light 16. The IF unit 32 receives traffic light information from the traffic light 16. The storage unit 48 stores the received traffic light information. The traffic light information includes intersection information and signal information, etc. The intersection information is one on an intersection where the traffic light 16 is installed, which indicates the installation location of the intersection. The signal information includes traffic light color information. The traffic light color information indicates the color of a traffic light; however, the color thereof is periodically changed, and hence the color is indicated in a schedule format herein. For example, it is indicated in such a way that the color is "red" from 12:00:00 to 12:05:59 and "blue" from 12:03:00 to 12:05:59.

The generation unit 46 extracts the traffic jam information, construction information, regulation information, and traffic light information, which have been stored in the storage unit 48, to store them in the data payload. The processor 26 makes the modem unit 24 and the RF unit 22 perform broadcast transmission of a packet signal during a road-to-vehicle transmission period. The control unit 30 controls the processes in the whole base station apparatus 10.

The structure is implemented in the hardware by any CPU of a computer, memory, and other LSI, and implemented in the software by a computer program or the like that is loaded in a memory. Herein, functional blocks implemented by the cooperation of hardware and software are depicted. Therefore, it will be obvious to those skilled in the art that these functional blocks may be implemented in a variety of manners by hardware only or any combination thereof.

Figure 6:
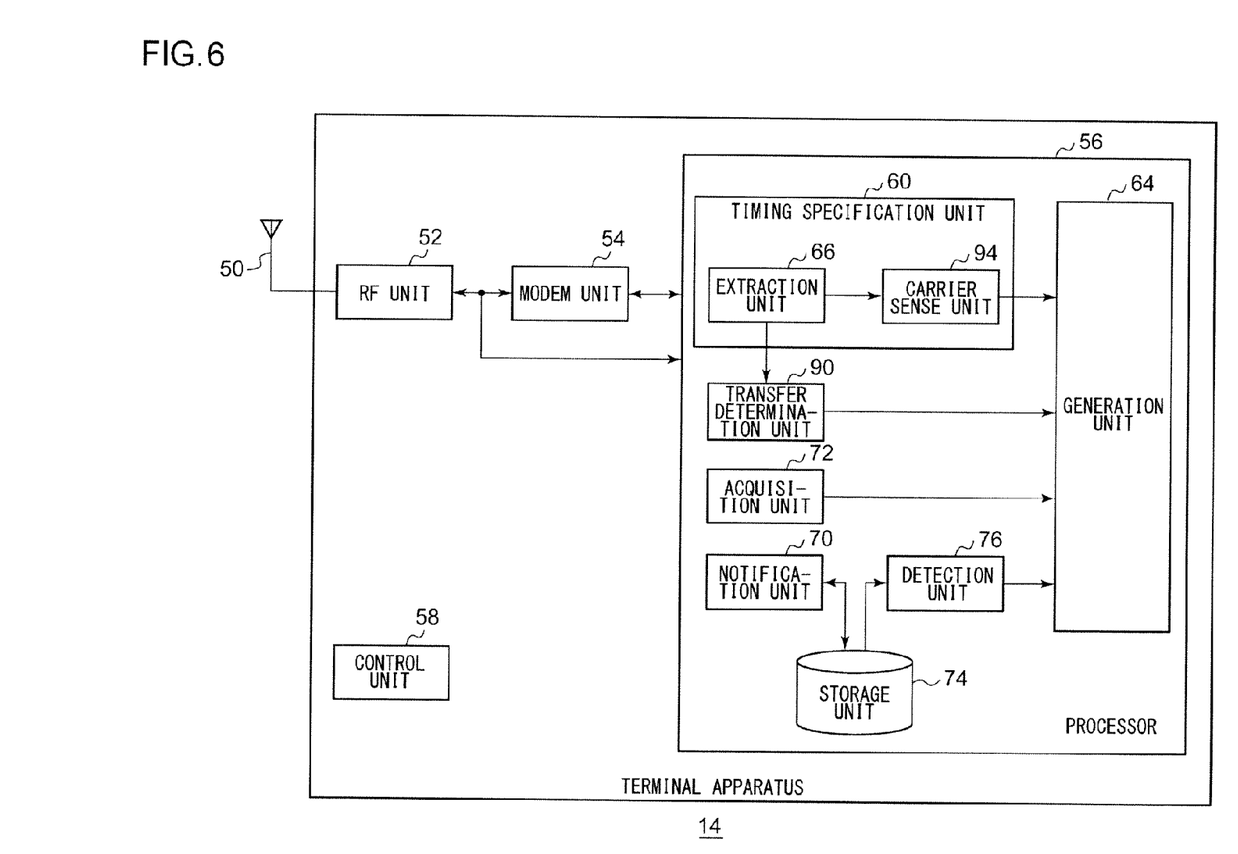
FIG. 6 is a view illustrating the structure of a terminal apparatus mounted on the vehicle in FIG. 1.

FIG. 6 illustrates the structure of a terminal apparatus 14 mounted on the vehicle 12. The terminal apparatus 14 includes an antenna 50, an RF unit 52, a modem unit 54, a processor 56, and a control unit 58. The processor 56 includes a generation unit 64, a timing specification unit 60, a transfer determination unit 90, a notification unit 70, an acquisition unit 72, a storage unit 74, and a detection unit 76. The timing specification unit 60 includes an extraction unit 66 and a carrier sense unit 94. The antenna 50, the RF unit 52, and the modem unit 54 perform the same processes as the antenna 20, the RF unit 22, and the modem unit 24 in FIG. 2. Therefore, description will be made herein, centered on the differences between the two groups.

The modem unit 54 and the processor 56 receive a packet signal from another non-illustrated terminal apparatus 14 or base station apparatus 10. As stated above, the modem unit 54 and the processor 56 receive a packet signal from the base station apparatus 10 during a road-to-vehicle transmission period. As stated above, the modem unit 54 and the processor 56 receive a packet signal from another terminal apparatus 14 during a inter-vehicle transmission period.

When a result of the demodulation from the modem unit 54 is a packet signal from the non-illustrated base station apparatus 10, the extraction unit 66 specifies the timing of a subframe in which a road-to-vehicle transmission period has been arranged. In the case, the extraction unit 66 presumes that the terminal apparatus exists in the area 212 in FIG. 1. The extraction unit 66 generates a frame based on the timing of the subframe and the content of the message header in the packet signal, specifically, the content of the RSU transmission period length. The generation of the frame can be achieved in the same way as that of the aforementioned frame specification unit 40, and hence description will be omitted herein. As a result, the extraction unit 66 generates a frame synchronized with the frame formed in the base station apparatus 10.

On the other hand, when not receiving an RSU packet signal, the extraction unit 66 presumes that the terminal apparatus exists in the outside area 214 in FIG. 1. When presuming that the terminal apparatus exists in the area 212, the extraction unit 66 selects an inter-vehicle transmission period. When presuming that the terminal apparatus exists in the outside area 214, the extraction unit 66 selects a timing irrelevant to the structure of a frame. When selecting a transmission period, the extraction unit 66 outputs both the timings of the frame and the subframe and the information on the inter-vehicle transmission period to the carrier sense unit 94. When selecting a timing irrelevant to the structure of a frame, the extraction unit 66 directs the carrier sense unit 94 to perform carrier sense.

The carrier sense unit 94 receives the information on both the timings of the frame and subframe and an inter-vehicle transmission period from the extraction unit 66. The carrier sense unit 94 measures an interference power by performing carrier sense in the inter-vehicle transmission period. The carrier sense unit 94 also determines a transmission timing in the inter-vehicle transmission period based on the interference power. Specifically, the carrier sense unit 94 stores a predetermined threshold in advance to compare the interference power with the threshold. When the interference power is smaller than the threshold, the carrier sense unit 94 determines a transmission timing. When directed by the extraction unit 66 to perform carrier sense, the carrier sense unit 94 determines a transmission timing by performing CSMA, without taking into consideration the structure of a frame. The carrier sense unit 94 notifies the generation unit 64 of the determined transmission timing.

The acquisition unit 72 includes a GPS receiver, a gyroscope, and a speed sensor, etc., which are not illustrated. The acquisition unit 72 acquires, by the data supplied from these apparatuses, the existing location, traveling direction, and traveling speed, etc., (hereinafter, collectively referred to as "location information") of the non-illustrated vehicle 12, i.e., the vehicle 12 on which the terminal apparatus 14 is mounted. The existing location is indicated by a latitude and a longitude. The acquisition of them can be achieved by using a publicly-known technique, and hence description will be omitted herein. The acquisition unit 72 outputs the location information to the generation unit 64.

The transfer determination unit 90 controls transfer of a message header. The transfer determination unit 90 extracts message headers from a packet signal. When the packet signal has been directly transmitted from the base station apparatus 10, the number of reuse ties is set to be "0"; on the other hand, when the packet signal has been transmitted from another terminal apparatus 14, the number of reuse times is set to be "1 or larger". The transfer determination unit 90 selects a message header to be transmitted from the extracted message headers. Herein, for example, a message header in which the number of reuse times is smallest is selected. The transfer determination unit 90 may also generate a new message header by combining the contents included in a plurality of message headers. The transfer determination unit 90 outputs the message header that has been selected to the generation unit 64. At the time, the transfer determination unit 90 increases the number of reuse times by "1".

The generation unit 64 receives location information from the acquisition unit 72 and receives a message header from the transfer determination unit 90. The generation unit 64 uses the MAC frame illustrated in FIGS. 5(*a*) and 5(*b*) to store the location information in the data payload. The generation unit 64 generates a packet signal including an MAC frame and performs broadcast transmission of the generated packet signal via the modem unit 54, the RF unit 52, and the antenna 50, at the transmission timing determined in the carrier sense unit 94. The transmission timing is included in an inter-vehicle transmission period.

Figure 7:
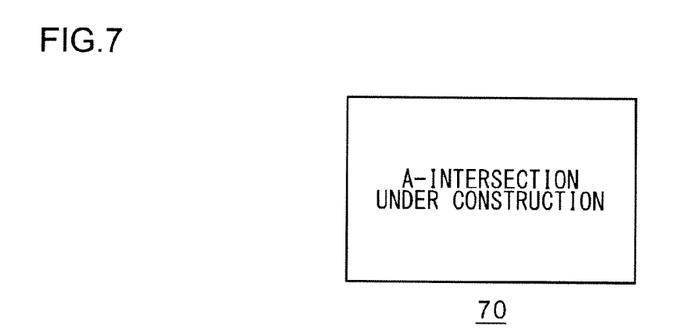
FIG. 7 is a view illustrating a screen displayed in a notification unit in FIG. 6.

The notification unit 70 acquires a packet signal from the non-illustrated base station apparatus 10 in a road-to-vehicle transmission period and also acquires a packet signal from another non-illustrated terminal apparatus 14 in an inter-vehicle transmission period. As a process in response to the acquired packet signal, the notification unit 70 notifies, via a monitor or speaker, a driver of approach of another non-illustrated vehicle 12, etc., in accordance with the content of the data stored in the packet signal. In addition, when construction information, regulation information, and traffic jam information, etc., are included in the packet signal from the non-illustrated base station apparatus 10, the notification unit 70 notifies, via a monitor or speaker, a driver of these information and makes the storage unit 74 stores these information. FIG. 7 illustrates a screen displayed in the notification unit 70. As illustrated, it is displayed that a traffic jam occurs. Description will be made, referring back to FIG. 6.

The storage unit 74 receives the construction information, regulation information, and traffic jam information, etc., from the notification unit 70 to store these information. When storing these information, the storage unit 74 also stores storage time. When information is again received from the notification unit 70 after storing these information, the storage unit 74 confirms whether the already-stored information and the received information are the same as each other. When they are not the same as each other, the storage unit 74 updates the already-stored information with the received information. For this updating, for example, overwriting is performed. When they are the same as each other, the storage unit 74 discards the received information. Irrespective of whether they are the same as each other, the storage unit 74 updates the storage time.

The detection unit 76 detects that a situation in which a packet signal from the base station apparatus 10 is received in the modem unit 54, etc., has changed to a situation in which the packet signal therefrom is not received. This corresponds to a fact that a terminal apparatus has moved from the area 212 to the outside area 214 in FIG. 1. When detecting that the packet signal from the base station apparatus 10 is not received, the detection unit 76 outputs the information stored in the storage unit 74 to the generation unit 64. The generation unit 64 generates a packet signal including the information stored in the storage unit 74. The generation unit 64 performs, via the modem unit 54 and the RF unit 52, broadcast transmission of the packet signal in an inter-vehicle transmission period.

The detection unit 76 may measure a period of time starting when the storage unit 74 has stored the information. Specifically, the detection unit 76 derives a difference between the latest storage time and the current time. In this case, when the detection unit 76 detects the fact that the packet signal from the base station apparatus 10 is not received and when the measured period of time is shorter than a threshold, the detection unit 76 outputs the information stored in the storage unit 74 to the generation unit 64. The generation unit 64 generates a packet signal including the information stored in the storage unit 74 to perform broadcast transmission of the packet signal in an inter-vehicle transmission period. As stated above, an effective period is set in the information from the base station apparatus 10. Alternatively, an effective area may be set in the information from the base station apparatus 10. That is, the terminal apparatus 14 stores the information in the effective area and does not broadcast the information when moving away by a distance to some extent. The control unit 58 controls operations of the whole terminal apparatus 14.

Figure 8:
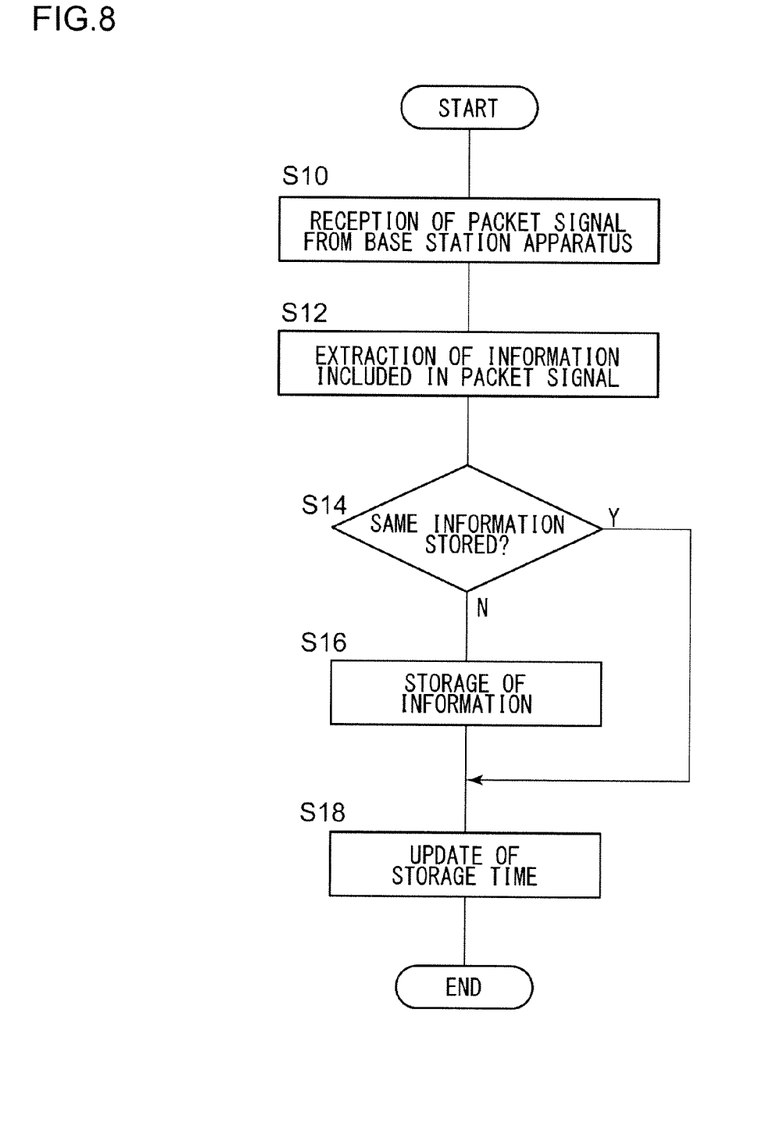
FIG. 8 is a flowchart illustrating storing procedures in the terminal apparatus in FIG. 6.

Operations of the communication system 100 having the aforementioned structure will be described. FIG. 8 is a flowchart illustrating storing procedures in the terminal apparatus 14. The modem unit 54, etc., receives a packet signal from the base station apparatus 10 (S10). The notification unit 70 extracts the information included in the packet signal (S12). When the same information is not stored (S14/N), the storage unit 74 stores the information (S16). When the same information is stored (S14/Y), the step 16 is skipped. The storage unit 74 updates the storage time (S18).

Figure 9:
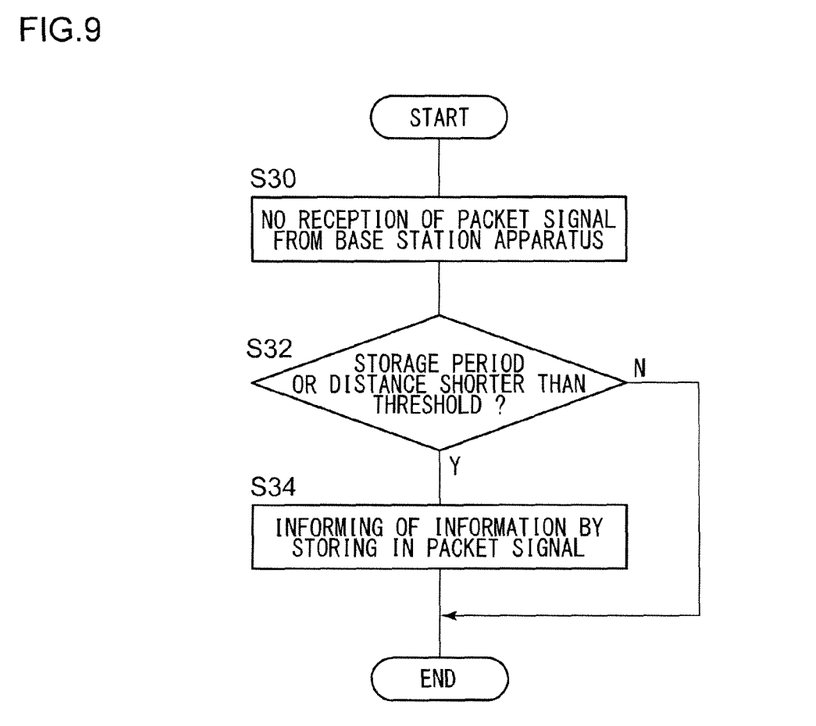
FIG. 9 is a flowchart illustrating broadcasting procedures in the terminal apparatus in FIG. 6.

FIG. 9 is a flowchart illustrating broadcasting procedures in the terminal apparatus 14. The detection unit 76 detects that the modem unit 54, etc., does not receive the packet signal from the base station apparatus 10 (S30). When the storage period or the distance is shorter than a threshold (S32/Y), the generation unit 64 broadcasts the information by storing it in the packet signal (S34). On the other hand, when the storage period is not shorter than the threshold (S32/N), the process ends.

According to the embodiment of the present invention, information from a base station apparatus are stored such that the stored information are broadcasted when a packet signal from the base station cannot be received, and hence the information can be notified even in an area where a packet signal from the base station apparatus cannot be received. Further, the information can be notified even in an area where a packet signal from the base station apparatus cannot be received, and hence information to be delivered in a road-to-vehicle communication can be efficiently notified. Furthermore, information is not notified when a period of time starting when the information has been stored, and hence an increase in traffic can be suppressed.

Further, a subframe that is being used by another base station apparatus can be specified based on not only a packet signal directly received from the another base station apparatus but also a packet signal received from a terminal apparatus, and hence the accuracy in specifying a currently used subframe can be improved. Furthermore, the accuracy in specifying a currently used subframe is improved, and hence the probability that packet signals transmitted from a base station apparatus may collide with each other can be reduced. Still furthermore, the probability that packet signals transmitted from a base station apparatus may collide with each other can be reduced, and hence a terminal apparatus can accurately recognize control information. Still furthermore, control information is accurately recognized, a road-to-vehicle transmission period can be accurately recognized. Still furthermore, a road-to-vehicle transmission period can be accurately recognized, and hence the probability that packet signals may collide with each other can be reduced.

A subframe other than a currently used subframe is preferentially used, and hence the probability that a packet signal may be transmitted at a timing at which the packet signal is overlapped with a packet signal from another base station apparatus. Further, a subframe whose received power is low is selected when any subframe is being used by another base station apparatus, and hence an influence of interference of packet signals can be suppressed. Still furthermore, a received power of a terminal apparatus is used as a received power from another base station apparatus, the base station apparatus being a transmission source of the control information that has been relayed by the terminal apparatus, a process of presuming a received power can be simply performed.

The present invention has been described above based on the embodiment. These embodiments are intended solely for the purpose of illustration, and it should be understood by those skilled in the art that various modifications are possible in combining those various components and various processing and those modifications also fall in the scope of the present invention.

In the embodiment of the present invention, the base station apparatus 10 or the terminal apparatus 14 broadcasts a packet signal including traffic jam information. However, the invention should not be limited thereto, and the base station apparatus 10 or the terminal apparatus 14 may transmit a packet signal including a traffic jam information, when another base station apparatus 14 demands delivery of traffic jam information. In that case, the another terminal apparatus 14 may demand it by designating a necessary intersection, or demand it in accordance with the traveling direction of a route in a navigation system. According to the present embodiment, the degree of freedom of transmission data can be improved.

In the embodiment of the present invention, the terminal apparatus 14 broadcasts an existing location, traveling direction, and traveling speed, etc., by storing them in a packet signal. Herein, the existing location, traveling direction, and traveling speed, etc., correspond to the latest information. However, the information to be broadcasted are not limited to these, and the terminal apparatus 14 may also broadcast, for example, histories of the existing location, traveling direction, and traveling speed, etc., which have been acquired in the past, by storing them in a packet signal. The base station apparatus 10 presumes a congested road or intersection based on these histories and stores, as the "information on traffic disturbance", information on the presumed road or intersection in a packet signal. Herein, the presumption of a congested road or intersection is performed when the number of vehicles whose traveling speed is lower than a first threshold is larger than a second threshold. That is, the "information on traffic disturbance" indicates how congested the flow of the current vehicles is. If information on several vehicles can be received, as stated above, it can be presumed how congested the intersection is. According to the present variation, "information on traffic disturbance" can be acquired when entering an intersection, without sensors, etc., for a traffic jam being installed on a road.

In the embodiment of the present invention, the terminal apparatus 14 broadcasts an existing location, traveling direction, and traveling speed, etc., by storing them in a packet signal. However, the information to be broadcasted are not limited to these, and the terminal apparatus 14 may derive the average value of the numbers of the packet signals received from other terminal apparatuses 14 per unit time, to broadcast it by storing in a packet signal. The base station apparatus 10 presumes a congested road or intersection based on these average values and stores, as the "information on traffic disturbance", information on the presumed road or intersection in a packet signal. Herein, the presumption of a congested road or intersection is performed when the number of average values each larger than a first threshold is larger than a second threshold. That is, the "information on traffic disturbance" indicates how many vehicles are crowded near an intersection. According to the present variation, "information on traffic disturbance" can be acquired when entering an intersection, without sensors, etc., for a traffic jam being installed on a road.

What is claimed is:

1. A terminal apparatus for performing inter-terminal communication, comprising:
   a receptor configured to receive a packet signal broadcasted by a base station apparatus and having a format in which a header and a payload are arranged;
   a storage configured to extract information included in the payload of the packet signal received in the receptor and to store the extracted information;
   a detector configured to detect a fact that the receptor does not receive the packet signal broadcasted by the base station apparatus; and
   a broadcaster configured to broadcast a packet signal including the information stored in the storage in response to the detector detecting the fact that the receptor does not receive the packet signal broadcasted by the base station apparatus.

2. The terminal apparatus according to claim 1, wherein the information stored in the storage is information on traffic disturbance.

3. The terminal apparatus according to claim 2, wherein the information on traffic disturbance stored in the storage is used for making a driver determine whether to avoid traffic disturbance.

4. The terminal apparatus according to claim 2, wherein the information on traffic disturbance stored in the storage is used for prompting a driver to avoid traffic disturbance.

5. The terminal apparatus according to claim 1, wherein the information stored in the storage is information on smooth travel of vehicle.

6. The terminal apparatus according to claim 1, wherein when the extracted information is not stored in the storage, the storage stores the extracted information and updates information on storage time; and when the extracted information is stored in the storage, the storage updates the information on storage time without storing the extracted information in the storage.

7. The terminal apparatus according to claim 1 further comprising a measurer configured to measure a period of time or distance starting when the storage has stored the information, wherein
   when the detector detects the fact and when the period of time or distance measured in the measurer is shorter than a threshold, the broadcaster broadcasts the packet signal including the information previously stored in the storage.

* * * * *